United States Patent [19]

Grah et al.

[11] 4,250,420
[45] Feb. 10, 1981

[54] SANDWICH STRUCTURE FOR A COMBINATION MOTOR AND GEAR TRAIN WITH A TIMING MECHANISM

[75] Inventors: Neil E. Grah, Fairland; Robert F. Weaver, Jamestown, both of Ind.

[73] Assignee: Emhart Industries, Inc., Indianapolis, Ind.

[21] Appl. No.: 84,974

[22] Filed: Oct. 15, 1979

[30] Foreign Application Priority Data

Jun. 5, 1979 [CA] Canada .................... 329108

[51] Int. Cl.³ .............................................. H02K 7/10
[52] U.S. Cl. .................................... 310/83; 310/71; 310/89; 200/38 B
[58] Field of Search .................... 310/83, 89, 71, 172, 310/162-164; 318/12, 13, 15; 339/19 R; 200/38 R, 38 B, 38 BA; 335/73

[56] References Cited
U.S. PATENT DOCUMENTS

| | | |
|---|---|---|
| 3,268,751 | 8/1966 | Nebiolo .................... 310/162 |
| 3,350,589 | 10/1967 | Svarnias .................... 310/164 |
| 3,391,258 | 7/1968 | Virnoche .................... 200/38 R |
| 3,727,015 | 4/1973 | Voland .................... 200/38 R |
| 3,823,280 | 10/1973 | Obermann .................... 200/38 B |
| 3,917,371 | 11/1975 | Hirokawa .................... 339/19 |
| 4,004,168 | 1/1977 | Hayon .................... 310/164 |
| 4,127,785 | 11/1978 | Noguchi .................... 310/89 |

*Primary Examiner*—R. Skudy
*Attorney, Agent, or Firm*—Robert F. Meyer; David W. Gomes

[57] ABSTRACT

A rotor, stator assembly, and a field coil are sandwiched between two field plates. A gear train is sandwiched between one of the field plates and another plate while the timing mechanism is carried in a cup shaped housing that is closed by the third plate. A pivotal terminal block is carried by one of the field plates and includes electrical terminals. Bussing bars extend from the electrical terminals through a terminal block carried by the third plate to engage slots in a wall of the cup shaped housing. A shroud substantially encloses the motor assembly and the gear train.

7 Claims, 5 Drawing Figures

SANDWICH STRUCTURE FOR A COMBINATION MOTOR AND GEAR TRAIN WITH A TIMING MECHANISM

BACKGROUND OF THE INVENTION

This is a substitute application of U.S. Ser. No. 921,444 filed July 3, 1978, now abandoned.

Generally speaking, the present invention pertains to a combination of a motor, a gear train connected to an output of the motor and a timing mechanism connected to an output of the gear train to be given thereby wherein there is provided a packaging improvement for the combination characterized by: first and second field plates; a field coil, and a rotor and stator assembly disposed between the field plates to provide a first sandwich structure; means connecting the field plates together; a cover substantially surrounding the first sandwich structure, the cover including a first terminal block at an end thereof, and first electrical terminals carried by the terminal block; a third plate disposed from the first sandwich structure is spaced parallel relation therefrom and means holding the third plate in the spaced parallel relation; posts carried by and between the third plate and the plate of the first sandwich structure, the gear train carried by the posts to provide a second sandwich structure; a second terminal block carried by the third plate substantially in line with the first terminal block, and bussing means connected to the first electrical terminals and extending through the second terminal block and including second electrical terminals; a cup shaped housing carrying the timing mechanism and having an open end, the cup shaped housing secured to the third plate at a surface opposite the second sandwich structure and at the open end to close the same, and slot means in a wall of the cup shaped housing receiving the second electrical terminals.

The present invention relates to a timing mechanism and a gear-motor drive means therefor wherein a motor and a gear train is packaged with the timing mechanism to provide a neat compact sandwich structure.

Timing mechanisms are widely used in appliances such as dishwashers, washers, dryers, and refrigerators to control their sequential operation. In refrigerators, the timing mechanism provides the defrost cycle for the refrigerator. Such a mechanism must be able to set into a small well confined space. Therefore in such an application it is necessary that the combination of the timer with its motor drive be packaged in a small neat compact manner.

OBJECTS OR FEATURES OF THE INVENTION

Accordingly, it is a feature of the present invention to provide a combination of a timing mechanism and a motor drive for the mechanism Wherein the combination is packaged in a neat and compact manner. Another feature of the invention is to provide such a package wherein the rotor, stator assembly, and the field coil of the motor are sandwiched between two field plates. Another feature of the invention is the provision of such a package wherein the gear train associated with the motor is sandwiched between a third plate and one of the field plates. Yet another feature of the invention is the provision of such a package wherein the timing mechanism is carried in a cup shaped housing with the third plate closing the open end of the cup shaped housing. Still another feature of the invention is the provision of such a package wherein the rotor is disposed within a circle of stator poles and the field coil is adjacent the circle of stator poles with the axis of the field coil being substantially parallel to the rotational axis of the rotor. Another feature of the invention is the provision of such a package wherein a cover substantially surround the first sandwich structure. Another feature of the invention is the provision of such a package wherein a terminal block is pivotly mounted between an edge of the cover and one of the first and second field plates. Yet another feature of the invention is the provision of such a package wherein a shroud made of a clear see-through plastic substantially enclosing the two named sandwich structures. These and other features of the invention will become apparent from the following description taken in conjunction with the accompanying drawings.

DETAILED DESCRIPTION OF THE INVENTION

Figure 1:
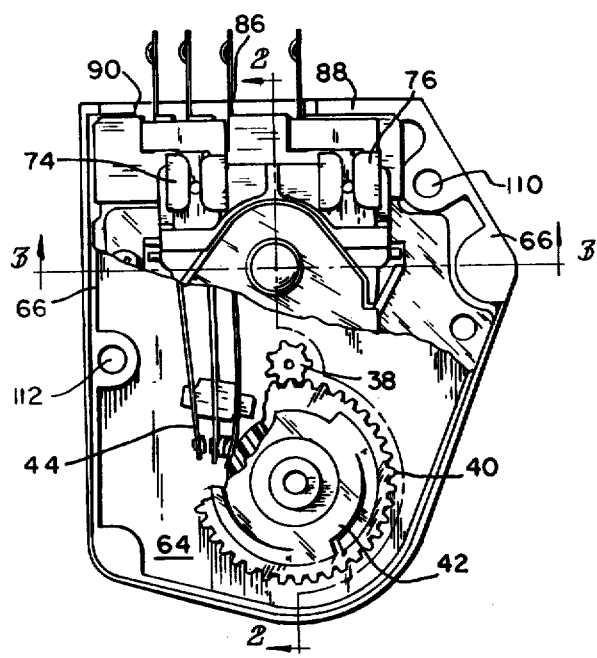
FIG. 1 is a top view of the combination with portions thereof removed for clarity.

Referring now to the drawings, there is shown a combination motor drive means 10, gear train 12, and a timing mechanism 14. The motor drive means includes a stator section 13 having stator poles 16 and 18 attached to field plates 20 and 22, a rotor 24 carrying permanent magnet rotor poles (not shown) for rotation within the stator poles and a field coil 26 which in general include a length of wire 28 carried on a bobbin 30. As is well known in the art, upon application of alternating current to the field coil, rotor 24 will rotate due to the magnetic flux generated between the stator and rotor poles. Also as is well known in the art, shading bars 25 and 27 are provided to insure that the rotor will turn in a predetermined direction. Gear train 12 includes a series of gears 32 and pinions 34 which connect an output pinion 36 of the rotor to an output pinion 38 of the gear train. Timing mechanism 14 includes a gear 40 engaging output pinion 38 and a cam means 42 constructed unitarily therewith. Rotation of cam means 42 opens and closes electrical switches 44 in accordance with the timing program of the cam. What has been described thus far is well known in the art and does not form a part of the present invention. The present invention is concerned with the manner in which these three mechanisms are packaged together.

As shown, the motor means 10 is sandwiched between field plates 20 and 22 which are connected to each other through a post 46 and a spacer plate 48. In order to provide a thin sandwich structure the coil is disposed adjacent the stator assembly with its axis being parallel to the axis of rotation of rotor 24. The resulting sandwich structure 21 is substantially surrounded by a cover 70 and spacer plate 48.

Gear train 12 is sandwiched between field plate 22 and a third plate 50 to form a sandwich structure 51. The third plate and the field plate are held in spaced parallel relation by a pair of screws 52 which are engaged in posts 54 and 56, the posts each being connected to plate 50 by insert molding the posts to the plate. Disposed and carried between the field plate 22 and plate 50 are a series of posts 58 and 60 upon which are carried the gears and pinions of the gear train.

Figure 4:
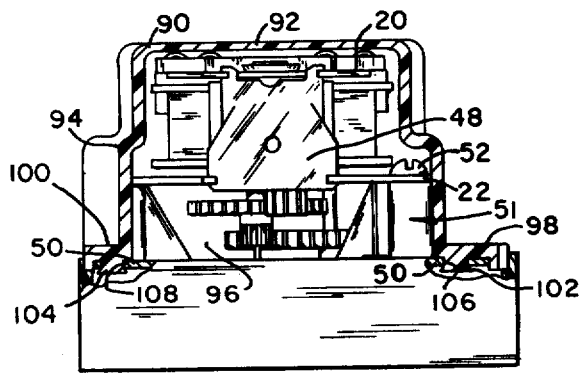
FIG. 4 is an end view of the combination.

Referring to FIG. 4, sandwich structures 21 and 51 are substantially enclosed by a shroud 90. Shroud 90 is cup shaped having a base portion 92 a side wall 94 and open end 96 such that the shroud can be placed over the structures. There are flanges 98 and 100 extending from the side wall 94. A plurality of pins 102 and 104 extend from and are integral with the flanges. As shown, the pins are inserted into apertures 106 and 108 of plate 50 and then headed to stake the shroud to the plate. The shroud is made of a clear, see-through plastic so that the motor and gear train is not only protected but can be readily observed. A suitable material would be polycarbonate resin such as General Electric Lexan 141.

Figure 3:
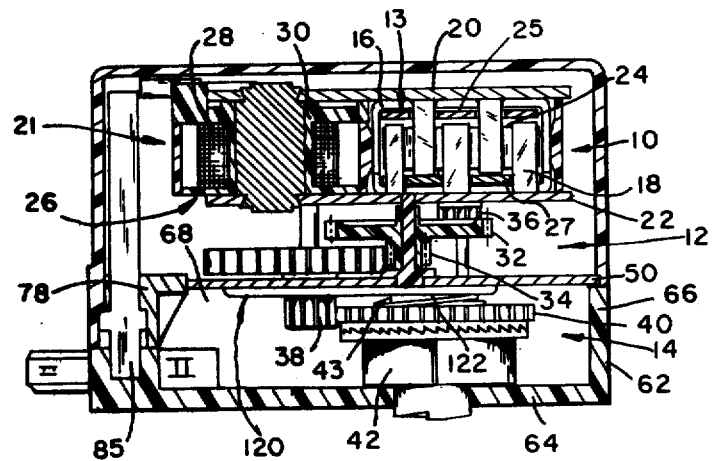
FIG. 3 is a section taken along the line 3—3 of FIG. 1.

Referring to FIGS. 1, 3, and 4 the timing mechanism 14 is enclosed in a cup shaped housing 62 having a base portion 64, sidewall 66 and an open end 68. Cup shaped housing 62 is connected to sandwich structure 51 such that plate 50 closes open end 68. More specifically, flanges 98 and 100 contain apertures through which can be inserted screws to be threaded into internally threaded posts 110 and 112 which are formed integral with side wall 66 of the cup shaped housing. Thus it can be seen that by merely removing two screws the cup shaped housing is easily removed for ready access to the timing mechanism 14 without disturbing the motor-gear train package contained in shroud 90.

Figure 2:
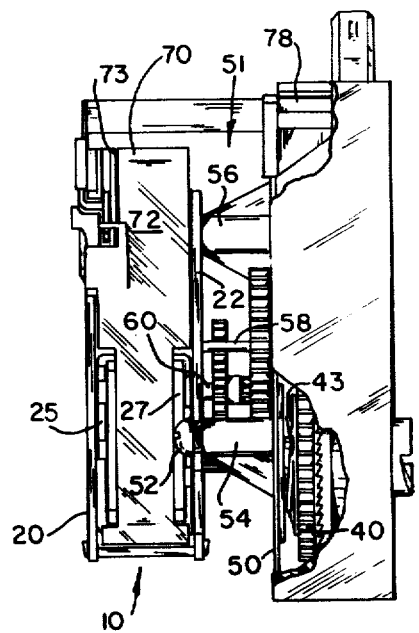
FIG. 2 is a section taken along the line 2—2 of FIG. 1 with portions thereof removed for clarity.
Figure 5:
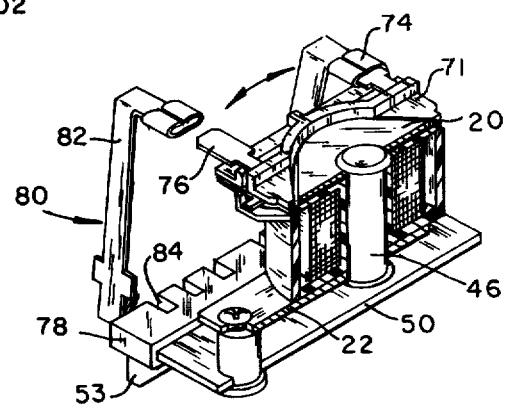
FIG. 5 is an enlarged isometric view showing a pivotal terminal block.

Referring to FIGS. 2 and 5, a cover 70 includes a side wall 72 which substantially surrounds the motor section 10. Included as part of the cover is a terminal block 71 which is pivotly connected on post 46 to be pivoted thereabout. It is carried between plate 20 and an edge 73 of the side wall 72. The pivoting of the terminal block provides for an easy mating of bussing means 80 connecting electrical terminals 74 and 76 (see also FIG. 1) for the coil 28 of the motor with the electrical terminals of the timing mechanism. A second terminal block 78 is carried by plate 50 in substantial alignment with terminal block 71. The terminal block includes a seat 53 which sets in an elongated notch 90 provided in the end section 88 of sidewall 66 (FIG. 1). Bussing means 80 includes bars 82 which extend through slots 84 provided in terminal block 78. The bussing means also includes electrical terminals 85 (FIG. 3) which set into slots 86 provided in elongated notch 90 (FIG. 1) of wall 88 of the cup shaped housing.

Referring to FIGS. 2 and 3, gear floats between cam means 42 and the plate 50 is axially spring biased through leave spring 43. Leaf spring 43 rotates with gear means 40 through its frictional engagement with the gear means. To provide for ease of rotation, a smooth bearing surface 120 is provided on plate 50. Bearing surface 120 includes a thin ring shaped strip of a suitable plastic 122 secured to the plate.

What is claimed is:

1. In a combination of a motor, a gear train connected to an output of said motor, and a timing mechanism connected to an output of said gear train to be driven thereby, a packaging improvement for said combination characterized by:
    (a) first and second field plates,
    (b) a field coil, rotor and stator assembly disposed between said first and second field plates to provide a first sandwich structure,
    (c) means connecting said field plates together including a post extending between and carried by said first and second field plates and a spacer plate connected at distal ends of said field plates at their ends opposite said post,
    (d) a side wall substantially surrounding said first sandwich structure, said side wall including a first terminal block pivotally mounted on said post at an end thereof between an edge of said side wall and one of said first and second field plates, and first electrical terminals carried by said terminal block,
    (e) a third plate disposed from said first sandwich structure in spaced parallel relation therefrom and means holding said third plate in said spaced parallel relation,
    (f) posts carried by and between said third plate and a plate of said first sandwhich structure, said gear train carried by said posts to provide a second sandwich structure,
    (g) a second terminal block carried by said third plate substantially in line with said first terminal block, and bussing means connected to said first electrical terminals and extending through said second terminal block and including second electrical terminals,
    (h) a cup shaped housing carrying said timing mechanism and having an open end, said cup shaped housing secured to said third plate at a surface opposite said second sandwich structure and at said open end to close same, and slot means in a wall of said cup shaped housing receiving said second electrical terminals.

2. The combination according to claim 1 wherein said rotor is disposed within a circle of stator poles and said field coil is adjacent said circle of stator poles with the axis of said field coil being substantially parallel to the rotational axis of said rotor.

3. The combination according to claim 1 wherein said cup shaped housing includes an elongated notch in a wall of same receiving said second terminal block.

4. The combination of claim 1 wherein said timing mechanism includes an input pinion and a spring biased gear cooperating therewith and wherein there is a bearing surface provided on said surface of said third plate opposite said second sandwich structure against which said spring biased gear rotates.

5. The combination of claim 4 wherein said bearing surface comprises a plastic ring carried on said surface opposite said second sandwich structure.

6. The combination of claim 1 further including a shroud substantially enclosing said first and second sandwich structure.

7. The combination of claim 6 wherein said shroud is made of a clear see-through material.

* * * * *